(12) United States Patent
Deghel et al.

(10) Patent No.: US 12,557,106 B2
(45) Date of Patent: Feb. 17, 2026

(54) METHOD AND APPARATUS FOR A RADIO NETWORK

(71) Applicant: Nokia Technologies Oy, Espoo (FI)

(72) Inventors: Matha Deghel, Paris (FR); Keeth Saliya Jayasinghe Laddu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 529 days.

(21) Appl. No.: 18/002,561

(22) PCT Filed: Jun. 29, 2020

(86) PCT No.: PCT/EP2020/068185
§ 371 (c)(1),
(2) Date: Dec. 20, 2022

(87) PCT Pub. No.: WO2022/002343
PCT Pub. Date: Jan. 6, 2022

(65) Prior Publication Data
US 2023/0239878 A1    Jul. 27, 2023

(51) Int. Cl.
*H04W 72/02* (2009.01)
*H04W 72/21* (2023.01)

(52) U.S. Cl.
CPC .................. *H04W 72/21* (2023.01)

(58) Field of Classification Search
CPC . H04W 72/02; H04W 72/04; H04W 72/0446; H04W 72/121; H04W 72/23;
(Continued)

(56) References Cited

U.S. PATENT DOCUMENTS 9,923,696 B2    3/2018  Lee et al.
2019/0052421 A1  2/2019  Yin et al.
(Continued)

FOREIGN PATENT DOCUMENTS

CN    111092697 A    5/2020
WO    2018/144470 A1  8/2018

OTHER PUBLICATIONS

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.
(Continued)

*Primary Examiner* — Bo Hui A Zhu
(74) *Attorney, Agent, or Firm* — Carter, DeLuca & Farrell LLP

(57) ABSTRACT

A method and a first apparatus (102) comprising at least one processor (118), at least one memory (120) including computer program code, and at least one receiver (112), the at least one processor (118), the at least one memory (120), and the at least one receiver (112) configured with the computer program code to cause the first apparatus (102) at least to receive a first configuration and a second configuration or to receive an indication comprising a first configuration and a second configuration, to configure a Physical Uplink Control Channel, PUCCH, for a PUCCH transmission according to the first configuration for a first PUCCH resource, configure the first PUCCH resource or a second PUCCH resource for the PUCCH repetition according to the second configuration, wherein the PUCCH repetition is a repetition of the PUCCH transmission.

1 Claim, 3 Drawing Sheets

(58) Field of Classification Search
CPC ..... H04W 72/50; H04W 72/51; H04W 72/52; H04W 72/53; H04W 72/54; H04W 72/541; H04W 72/542; H04W 72/543; H04W 72/56

See application file for complete search history.

(56) References Cited

U.S. PATENT DOCUMENTS

2019/0090219 A1    3/2019    Lee et al.
2020/0154467 A1    5/2020    Gong et al.
2021/0392666 A1*   12/2021   Huang ................. H04W 72/23

OTHER PUBLICATIONS

"3rd Generation Partnership Project; Technical Specification Group Radio Access Network; NR; Physical layer procedures for control (Release 16)", 3GPP TS 38.213, V16.1.0, Mar. 2020, pp. 1-156.

"New WID: Further enhancements on MIMO for NR", 3GPP TSG RAN Meeting #86, RP-193133, Agenda: 9.1.1, Samsung, Dec. 9-12, 2019, 5 pages.

International Search Report and Written Opinion received for corresponding Patent Cooperation Treaty Application No. PCT/EP2020/068185, dated Mar. 19, 2021, 16 pages.

"Enhancements on multi-TRP/panel transmission", 3GPP TSG RAN WG1 Meeting #98bis, R1-1910582, Agenda: 7.2.8.2, LG Electronics, Oct. 14-20, 2019, 23 pages.

"Discussion on multi-beam enhancement", 3GPP TSG RAN WG1 #97, R1-1906225, Agenda: 7.2.8.3, Ntt Docomo, Inc. May 13-17, 2019, pp. 1-24.

Office Action received for corresponding European Patent Application No. 20735171.9, dated Feb. 20, 2025, 7 pages total.

\* cited by examiner

METHOD AND APPARATUS FOR A RADIO NETWORK

RELATED APPLICATION

This application was originally filed as PCT Application No. PCT/EP2020/068185, filed on Jun. 29, 2020, which is incorporated herein by reference in its entirety.

FIELD OF THE INVENTION

Various example embodiments described herein relate to a method and apparatus for a radio access network (RAN).

BACKGROUND

The Radio Resource Control (RRC) control plane functionality is responsible for handling the RAN-related control-plane procedures.

SUMMARY

In one aspect of the description, a first apparatus comprises at least one processor, at least one memory including computer program code, and at least one receiver, the at least one processor, the at least one memory, and the at least one receiver configured with the computer program code to cause the first apparatus at least to receive a first configuration and a second configuration or to receive an indication comprising a first configuration and a second configuration, to configure a Physical Uplink Control Channel, PUCCH, for a PUCCH transmission according to the first configuration for a first PUCCH resource, configure the first PUCCH resource or a second PUCCH resource for the PUCCH repetition according to the second configuration, wherein the PUCCH repetition is a repetition of the PUCCH transmission.

The first apparatus may be configured to determine at least one first parameter of a characteristic of a PUCCH format for the PUCCH transmission according to the first configuration that differs from at least one second parameter of the characteristic of the PUCCH format for the PUCCH repetition according to the second configuration or to determine a first PUCCH resource index for the PUCCH transmission according to the first configuration that differs from a second PUCCH resource index for the PUCCH repetition according to the second configuration.

The first apparatus may be configured to receive a first indication comprising the first PUCCH resource index and the second PUCCH resource index, select the first PUCCH resource for the PUCCH transmission according the first PUCCH resource index, select the second PUCCH resource for the PUCCH repetition depending on the second PUCCH resource index.

The first apparatus may be configured to select the first PUCCH resource or the second PUCCH resource from a set of configured PUCCH resources for the first apparatus.

The first apparatus may be configured to receive at least one parameter of the first configuration or/and the second configuration that defines at least one of a number of consecutive symbols, a number of PRBs, and a starting symbol, and to determine the characteristic of the PUCCH format for the PUCCH transmission according to the at least one parameter of the first configuration or/and to determine the characteristic of the PUCCH format for the PUCCH repetition according to the at least one parameter of the second configuration.

The first apparatus may be configured to receive a first number of PRBs and a second number of PRBs or to receive a second indication comprising a first number of Physical Resource Blocks, PRBs, and a second number of PRBs, to configure the PUCCH resource for the PUCCH transmission according to the first number of PRBs, and to configure the PUCCH resource for the PUCCH repetition according to the second number of PRBs.

The first apparatus may be configured to receive a first number of symbols and a second number of symbols or to receive a third indication comprising a first number of symbols and a second number of symbols, to configure the PUCCH resource for the PUCCH transmission according to the first number, to configure the PUCCH resource for the PUCCH repetition according to the second number.

The first apparatus may be configured to receive a first pattern indicating a configuration or selection of PUCCH resources for the PUCCH transmission, the PUCCH repetition and/or at least one further PUCCH repetition within a repetition bundle of a PUCCH repetition operation, or to receive a fourth indication comprising a first pattern indicating a configuration or selection of PUCCH resources for the PUCCH transmission, the PUCCH repetition and/or at least one further PUCCH repetition within a repetition bundle of a PUCCH repetition operation, and to configure or to select PUCCH resources for the PUCCH transmission, the PUCCH repetition and/or at least one further PUCCH repetition within the repetition bundle of the PUCCH repetition operation according to the first pattern.

The first apparatus may be configured to receive a second pattern indicating a configuration or selection of slots or sub-slots for the PUCCH transmission, the PUCCH repetition and/or at least one further PUCCH repetition, or to receive a fifth indication comprising a second pattern indicating a configuration or selection of slots or sub-slots for the PUCCH transmission, the PUCCH repetition and/or at least one further PUCCH repetition within a repetition bundle of a PUCCH repetition operation, and to configure or select slots or sub-slots for the PUCCH transmission, the PUCCH repetition and/or at least one further PUCCH repetition within the repetition bundle of the PUCCH repetition operation according to the second pattern.

The first apparatus may be configured to receive a rule or an indication comprising a rule, the rule indicating a slot or a sub-slot or a repetition occasion of the PUCCH repetition, and wherein the first apparatus is configured to send the PUCCH transmission and the PUCCH repetition according to the rule.

The first apparatus may be configured to receive a configuration or a parameter related to the PUCCH resource and/or PUCCH resource index of the PUCCH transmission or repetition or to receive a sixth indication, wherein the sixth indication defines a configuration or a parameter related to the PUCCH resource and/or PUCCH resource index of the PUCCH transmission or repetition, and to determine the first configuration or the second configuration depending on the configuration or the parameter related to the PUCCH resource and/or PUCCH resource index of the PUCCH transmission or repetition.

The configuration or the parameter may define at least one of a PUCCH format configuration, a PUCCH spatial relation, a transmission configuration indicator, TCI, state, a number of PRBs or a number of symbols.

In one aspect of the description, a second apparatus comprises at least one processor, at least one memory including computer program code, and at least one sender, the at least one processor, the at least one memory, and the at least one sender configured with the computer program code to cause the second apparatus at least to determine a first configuration for a Physical Uplink Control Channel, PUCCH, transmission, to determine a second configuration for a PUCCH repetition, wherein the PUCCH repetition is a repetition of the PUCCH transmission, and to send the first configuration and the second configuration or to send an indication comprising the first configuration and the second configuration.

The second apparatus may be configured to determine at least one first parameter of a characteristic of a PUCCH format of the first configuration that differs from at least one second parameter of the characteristic of the PUCCH format of the second configuration or to determine a first PUCCH resource index of the first configuration that differs from a second PUCCH resource index for the second configuration.

The second apparatus may be configured to send the first PUCCH resource index and the second PUCCH resource index or to send a first indication comprising the first PUCCH resource index and the second PUCCH resource index.

The second apparatus may be configured to select the first PUCCH resource or the second PUCCH resource from a set of configured PUCCH resources.

The second apparatus may be configured to determine at least one parameter for the first configuration and/or the second configuration that defines at least one of a number of consecutive symbols, a number of Physical Resource Blocks, PRBs, and a starting symbol.

The second apparatus may be configured to send a first number of PRBs and a second number of PRBs or to send a second indication comprising a first number of PRBs and a second number of PRBs.

The second apparatus may be configured to send a first number of symbols and a second number of symbols or to send a third indication comprising a first number of symbols and a second number of symbols.

The second apparatus may be configured to send a first pattern indicating a configuration or selection of PUCCH resources for the PUCCH transmission, the PUCCH repetition and/or at least one further PUCCH repetition within a repetition bundle of a PUCCH repetition operation, or to send a fourth indication comprising a first pattern indicating a configuration or selection of PUCCH resources for the PUCCH transmission, the PUCCH repetition and/or at least one further PUCCH repetition within a repetition bundle of a PUCCH repetition operation.

The second apparatus may be configured to send a second pattern indicating a configuration or a selection of slots or sub-slots for the PUCCH transmission, the PUCCH repetition and/or at least one further PUCCH repetition within a repetition bundle of a PUCCH repetition operation or to send a fifth indication comprising a second pattern indicating a configuration or a selection of slots or sub-slots for the PUCCH transmission, the PUCCH repetition and/or at least one further PUCCH repetition within a repetition bundle of a PUCCH repetition operation.

The second apparatus may be configured to send a rule or an indication comprising a rule, the rule indicating a slot or a sub-slot or a repetition occasion of the PUCCH repetition.

The second apparatus may be configured to send a configuration or a parameter related to the PUCCH resource and/or PUCCH resource index of the PUCCH transmission or repetition or to send a sixth indication, wherein the sixth indication defines a configuration or a parameter related to the PUCCH resource and/or PUCCH resource index of the PUCCH transmission or repetition.

The configuration or the parameter may define at least one of a PUCCH format configuration, a PUCCH spatial relation, a transmission configuration indicator, TCI, state, a number of PRBs or a number of symbols.

According to one aspect of the description, a first method comprises receiving a first configuration and a second configuration or receiving an indication comprising a first configuration and a second configuration, configuring a Physical Uplink Control Channel, PUCCH, for a PUCCH transmission according to the first configuration for a first PUCCH resource, configuring the first PUCCH resource or a second PUCCH resource for the PUCCH repetition according to the second configuration, wherein the PUCCH repetition is a repetition of the PUCCH transmission.

The method may comprise determining at least one first parameter of a characteristic of a PUCCH format for the PUCCH transmission according to the first configuration that differs from at least one second parameter of the characteristic of the PUCCH format for the PUCCH repetition according to the second configuration or determining a first PUCCH resource index for the PUCCH transmission according to the first configuration that differs from a second PUCCH resource index for the PUCCH repetition according to the second configuration.

The method may comprise receiving a first indication comprising the first PUCCH resource index and the second PUCCH resource index, selecting the first PUCCH resource for the PUCCH transmission according the first PUCCH resource index, selecting the second PUCCH resource for the PUCCH repetition depending on the second PUCCH resource index.

The method may comprise selecting the first PUCCH resource or the second PUCCH resource from a set of configured PUCCH resourced for the first apparatus.

The method may comprise receiving at least one parameter of the first configuration or/and the second configuration that defines at least one of a number of consecutive symbols, a number of PRBs, and a starting symbol, and determining the characteristic of the PUCCH format for the PUCCH transmission according to the at least one parameter of the first configuration or/and determining the characteristic of the PUCCH format for the PUCCH repetition according to the at least one parameter of the second configuration.

The method may comprise receiving a first number of PRBs and a second number of PRBs or to receive a second indication comprising a first number of Physical Resource Blocks, PRBs, and a second number of PRBs, configuring the PUCCH resource for the PUCCH transmission according to the first number of PRBs, and configuring the PUCCH resource for the PUCCH repetition according to the second number of PRBs.

The method may comprise receiving a first number of symbols and a second number of symbols or receiving a third indication comprising a first number of symbols and a second number of symbols, configuring the PUCCH resource for the PUCCH transmission according to first number, configuring the PUCCH resource for the PUCCH repetition according to the second number.

The third indication may comprise a first element, wherein the third indication comprises a second element, wherein the method comprises mapping the first element to the first number of symbols, and mapping the second element to the second number of symbols.

The method may comprise receiving a first pattern indicating a configuration or selection of PUCCH resources for the PUCCH transmission, the PUCCH repetition and/or at least one further PUCCH repetition within a repetition bundle of a PUCCH repetition operation, or receiving a fourth indication comprising a first pattern indicating a configuration or selection of PUCCH resources for the PUCCH transmission, the PUCCH repetition and/or at least one further PUCCH repetition within a repetition bundle of a PUCCH repetition operation, and configuring or selecting PUCCH resources for the PUCCH transmission, the PUCCH repetition and/or at least one further PUCCH repetition within the repetition bundle of the PUCCH repetition operation according to the first pattern.

The method may comprise receiving a second pattern indicating a configuration or selection of slots or sub-slots for the PUCCH transmission, the PUCCH repetition and/or at least one further PUCCH repetition within a repetition bundle of a PUCCH repetition operation, or receiving a fifth indication comprising a second pattern indicating a configuration or selection of slots or sub-slots for the PUCCH transmission, the PUCCH repetition and/or at least one further PUCCH repetition within a repetition bundle of a PUCCH repetition operation, and configuring or selecting slots or sub-slots for the PUCCH transmission, the PUCCH repetition and/or at least one further PUCCH repetition within the repetition bundle of the PUCCH repetition operation according to the second pattern.

The method may comprise receiving a rule or an indication comprising a rule, the rule indicating a slot or a sub-slot or a repetition occasion of the PUCCH repetition, and sending the first PUCCH repetition and the second PUCCH repetition according to the rule.

The method may comprise receiving a configuration or a parameter related to the PUCCH resource and/or PUCCH resource index of the PUCCH transmission or repetition or receiving a sixth indication, wherein the sixth indication defines a configuration or a parameter related to the PUCCH resource and/or PUCCH resource index of the PUCCH transmission or repetition, and determining the first configuration or the second configuration depending on the configuration or the parameter related to the PUCCH resource and/or PUCCH resource index of the PUCCH transmission or repetition.

The configuration or the parameter may define at least one of a PUCCH format configuration, a PUCCH spatial relation, a transmission configuration indicator, TCI, state, a number of PRBs or a number of symbols.

According to one aspect of the description, a second method comprises determining a first configuration for a Physical Uplink Control Channel, PUCCH, transmission, determining a second configuration for a PUCCH repetition, wherein the PUCCH repetition is a repetition of the PUCCH transmission, and sending the first configuration and the second configuration or sending an indication comprising the first configuration and the second configuration.

The method may comprise determining at least one first parameter of a characteristic of a PUCCH format of the first configuration that differs from at least one second parameter of the characteristic of the PUCCH format of the second configuration or determining a first PUCCH resource index of the first configuration that differs from a second PUCCH resource index for the second configuration.

The method may comprise sending the first PUCCH resource index and the second PUCCH resource index or sending a first indication comprising the first PUCCH resource index and the second PUCCH resource index.

The method may comprise selecting the first PUCCH resource or the second PUCCH resource from a set of configured PUCCH resourced.

The method may comprise determining at least one parameter for the first configuration or the second configuration that defines at least one of a number of consecutive symbols, a number of Physical Resource Blocks, PRBs, and a starting symbol.

The method may comprise sending a first number of PRBs and a second number of PRBs or to send a second indication comprising a first number of PRBs and a second number of PRBs.

The method may comprise sending a first number of symbols and a second number of symbols or to send a third indication comprising a first number of symbols and a second number of symbols.

The method may comprise sending a first pattern indicating a configuration or selection of PUCCH resources for the PUCCH transmission, the PUCCH repetition and/or at least one further PUCCH repetition within a repetition bundle of a PUCCH repetition operation or sending a fourth indication comprising a first pattern indicating a configuration or selection of PUCCH resources for the PUCCH transmission, the PUCCH repetition and/or at least one further PUCCH repetition within a repetition bundle of a PUCCH repetition operation.

The method may comprise sending a second pattern indicating a configuration or a selection of slots or sub-slots for the PUCCH transmission, the PUCCH repetition and/or at least one further PUCCH repetition within a repetition bundle of a PUCCH repetition operation or sending a fifth indication comprising a second pattern indicating a configuration or a selection of slots or sub-slots for the PUCCH transmission, the PUCCH repetition and/or at least one further PUCCH repetition within a repetition bundle of a PUCCH repetition operation.

The method may comprise sending a rule or an indication comprising a rule, the rule indicating a slot or a sub-slot or a repetition occasion of the PUCCH repetition.

The method may comprise sending a configuration or a parameter related to the PUCCH resource and/or PUCCH resource index of the PUCCH transmission or repetition or sending a sixth indication, wherein the sixth indication defines a configuration or a parameter related to the PUCCH resource and/or PUCCH resource index of the PUCCH transmission or repetition.

The configuration or the parameter may define at least one of a PUCCH format configuration, a PUCCH spatial relation, a transmission configuration indicator, TCI, state, a number of PRBs or a number of symbols.

DESCRIPTION

Figure 1:
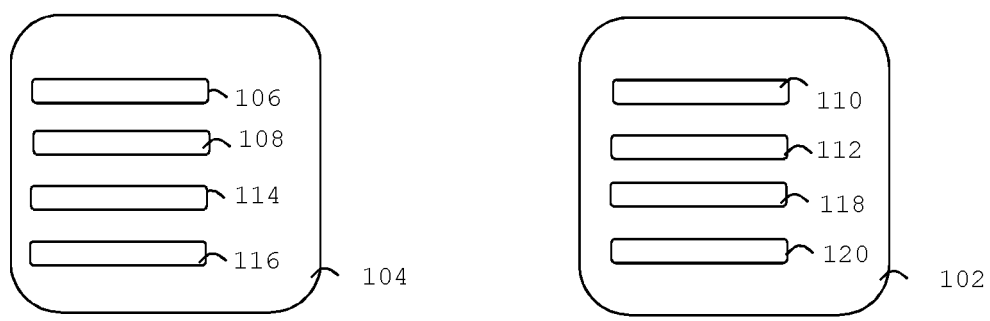
FIG. 1 depicts schematically aspects of a radio access network.

FIG. 1 schematically depicts first aspects of a radio access network (RAN). The RAN may be a next generation RAN (NG-RAN). The RAN may comprise multiple transmission and reception points (multi-TRPs). The RAN comprises a first apparatus 102 configured to send data to and receive data from a second apparatus 104 via one or multiple of the multi-TRPs. The data may be user plane data or control plane information.

The user plane data may be processed by a user plane protocol stack between the first apparatus 102 and the second apparatus 104. The user plane protocol stack may comprise sub-layers: Packet Data Convergence Protocol (PDCP), radio Link Control (RLC), Medium Access Control (MAC) or Service Data Adaptation Protocol (SDAP).

The control plane data may be processed by a control plane protocol stack comprising a Radio Resource Control layer (RRC). The control plane protocol stack may also comprise Packet Data Convergence Protocol (PDCP), radio Link Control (RLC), Medium Access Control (MAC). The RRC may be configured to configure the sub-layers.

A Physical Uplink Control Channel (PUCCH) may be utilized to convey Uplink Control Information (UCI). The first apparatus 102 may utilize a slot or a sub-slot for a PUCCH transmission or a PUCCH repetition, i.e. a repetition of the PUCCH transmission.

The first apparatus 102 may be a user equipment (UE). The first apparatus 102 may utilize a number of symbols, a number of PRBs, and a starting symbol for the PUCCH repetition or PUCCH transmission. These parameters may be determined based on a PUCCH resource. The PUCCH resource may be identified by a PUCCH resource index.

The PUCCH resource may comprise the following parameters.

The PUCCH resource index: the PUCCH resource index is used to identify the PUCCH resource.

A configuration for a PUCCH format: which contains e.g. a number of symbols and a number of Physical Resource Blocks (PRBs).

An index of a first PRB prior to frequency hopping or for no frequency hopping.

An index of the first PRB after frequency hopping (if any). Below, some characteristics of some of the PUCCH formats defined in NR are summarized, where OFDM symbol stands for Orthogonal Frequency-Division Multiplexing (OFDM) symbol:

| PUCCH format: | 1 | 3 | 4 |
| --- | --- | --- | --- |
| Length in OFDM symbols: | 4-14 | 4-14 | 4-14 |
| Number of bits: | ≤2 | >2 | >2 |
| Number of PRBs: | 1 | variable, up to 16 | 1 |

A UE can be configured up to four sets of PUCCH resources, where at least one PUCCH resource set corresponds to a certain range of UCI load. A PUCCH resource set 0 can handle UCI payloads up to two bits and thus may contain PUCCH formats 0 and 1, whereas the other PUCCH resource sets may contain any PUCCH format except format 0 and 1.

When the UE needs to send UCI including at least HARQ-ACK, the PUCCH resource set is determined based on the UCI load and the PUCCH resource within this set is determined using the PUCCH resource indicator (PRI) in the downlink control information (DCI).

The network may have a control on which resource the UCI is transmitted. On the other hand, the PUCCH resources for a scheduling request (SR) and/or a periodic CSI (P-CSI) may be semi-statically configured by RRC. The corresponding resources may be given in the SR and/or the CSI configurations.

The second apparatus 104 may be a network entity, e.g. a next generation evolved node B gNB, a next generation evolved node B central unit, gNB-CU or a next generation evolved node B distributed unit, gNB-DU.

Different transmission and reception points (TRPs) may experience different pathloss or blockage situations, depending for example on an environment of the first apparatus 102 or a movement of the first apparatus 102 or an object in the environment. A channel quality or other characteristic for the PUCCH repetitions thereof could greatly differ from one TRP or beam to another.

A PUCCH repetition operation may comprise sending one repetition or multiple repetitions of the substantially same UCI. The PUCCH repetition operation may be defined on multiple slots or sub-slots for PUCCH formats 1, 3 and 4. This PUCCH repetition operation may increase reliability and coverage for the transmitted UCI. For at least one of the PUCCH formats, the repetition operation, if enabled, may consist in sending a PUCCH repetition carrying an UCI and repeating the PUCCH carrying the UCI over multiple consecutive slots. Specifically, for PUCCH formats 1, 3, or 4, a UE may be configured via RRC with a number of slots for repetitions of a PUCCH (transmission).

The PUCCH repetition operation may comprise configuring the UE to repeat the PUCCH carrying UCI. The PUCCH repetition operation may comprise to transmit UCI on a PUCCH resource which is identified by a PUCCH resource index.

An improved allocation for a PUCCH repetition operation is described below. This allocation is particularly useful for multi-TRP operation.

According to one aspect, an allocation flexibility is achieved by signalling for configuring the first apparatus 102 at least two PUCCH resource indexes. At least one PUCCH resource index may identify a PUCCH resource. At least one PUCCH resource index may be used for at least one PUCCH repetition within a PUCCH repetition bundle. Preferably, at least one PUCCH resource index may be used for the PUCCH repetition within the substantially same repetition bundle. Note that a PUCCH repetition may also be referred to as PUCCH transmission; within a repetition bundle. Also, the first PUCCH transmission may be referred to as a PUCCH repetition; i.e. repetition #0. Hence, any PUCCH to be transmitted within a repetition bundle as part of a repetition operation may be referred to as PUCCH transmission and/or PUCCH repetition. In addition, a PUCCH repetition/transmission may refer to an actual or nominal repetition/transmission. Further, the term PUCCH repetition/transmission may be equivalent to PUCCH repetition/transmission occasion within a repetition bundle.

According to one aspect, mapping information is provided so that the first apparatus 102 can determine how to map at least one of the indicated resource indexes to at least one PUCCH repetition within the repetition bundle.

According to one aspect, an allocation flexibility is achieved by signaling for configuring the first apparatus 102 at least two numbers of PRBs and/or numbers of symbols, e.g. OFDM symbols. These numbers may be utilized for the PUCCH transmission and at least one repetition or multiple repetitions within a repetition bundle.

According to one aspect, mapping information is provided so that the first apparatus 102 can determine how to map the indicated numbers of PRBs and/or numbers of symbols to the PUCCH transmission and one repetition or multiple repetitions within the PUCCH repetition bundle.

The second apparatus 104 comprises a first sender 106 and a plurality of first receivers 108. The first apparatus 102 comprises a second sender 110 and a second receiver 112. The second apparatus 104 in the example comprises at least one first processor 114 and at least one first memory 116. The first apparatus 102 in the example comprises at least one second processor 118 and at least one second memory 120. These are configured to perform steps in the methods described below.

Figure 2:
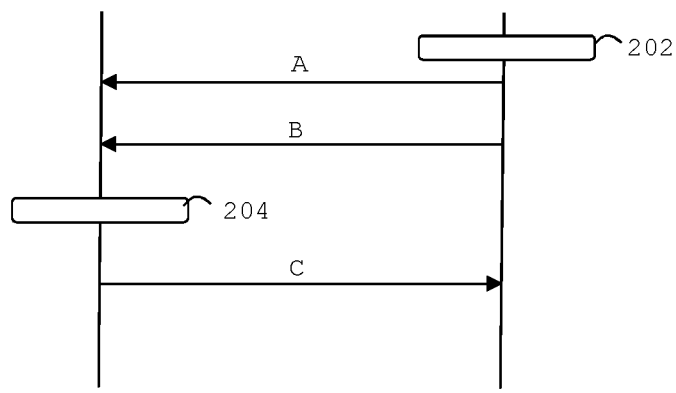
FIG. 2 depicts a sequence diagram,
FIG. 3 schematically depicts a first example,
FIG. 4 schematically depicts a second example.

FIG. 2 schematically depicts a sequence diagram comprising aspects of configuring the first apparatus 102 and of the PUCCH repetition operation.

The first sender 106 is configured to send a first message A. The first sender 106 may be configured to send a second message B.

The second receiver 112 is configured to receive the first message A. The second receiver 112 may be configured to receive the second message B.

The second sender 110 is configured to send a third message C. The third message C may be a PUCCH transmission and/or a repetition thereof.

The plurality of first receivers 108 are configured to receive the third message C.

Referencing the sequence diagram in FIG. 2, two exemplary methods are described below.

Example 1 is for instance more suitable for transmitting Hybrid automatic repeat request (HARQ) Acknowledgement (HARQ-ACK) for dynamically scheduled Physical Downlink Shared Channels (PDSCHs)

The second apparatus 104 may determine a configuration for the first apparatus 102 in a step 202. The content of the first message A and of the second message B may be determined in step 202.

In this example, the second apparatus 104 indicates with the first message A, e.g. using a codepoint in the DCI for scheduling the PDSCH or PDSCHs, two PUCCH resource indices.

Two PUCCH resource indexes may be associated or mapped with the substantially same codepoint. This relation may be configured e.g. via MAC or RRC. Alternatively, the two indexes may be explicitly indicated in the DCI using separate fields.

In this example, the second apparatus 104 indicates with the second message B, e.g. via RRC or MAC, on how to map the indicated PUCCH resources to the multiple PUCCH repetitions within a repetition bundle. Repetition bundle refers to the plurality of PUCCH repetitions/transmissions in a substantially same PUCCH repetition operation. Alternatively, or additionally, at least part of the mapping information may be sent through DCI and/or MAC CE. The mapping information may be sent explicitly, or, alternatively, some implicit ways could be used.

One possibility for implicitly determining and/or configuring the mapping information is to use one PUCCH resource index for repetitions with even numbers, i.e. #0, 2, . . . and the other PUCCH resource index for repetitions with odd numbers, i.e. #1, 3, . . . . To determine which resource index is to be used for even or odd numbers, the second apparatus 104 and/or the first apparatus 102 may rely on a lowest or largest index. In one aspect, by configuration, the resource with the lowest index may be used for repetitions with even numbers.

Another possibility for implicitly determining and/or configuring the mapping information is to equally split the number of repetitions and use one PUCCH resource index for the first half of the repetition bundle and the other resource index for the second half. To determine which resource index is to be used for the first part or half of the PUCCH repetitions of a repetition bundle, one way is to rely on the lowest or largest index. In one aspect, the PUCCH resource with the lowest index may be used for repetitions of the first part, and the PUCCH resource with the highest index may be used for the second part. Multiple PUCCH resources may be assigned to multiple parts alike based on the increasing or decreasing number of their index.

After the first apparatus 102 is configured in a step 204 accordingly, the third message C may be sent according to the configuration.

An exemplary case is described below referencing FIG. 3.

Figure 3:
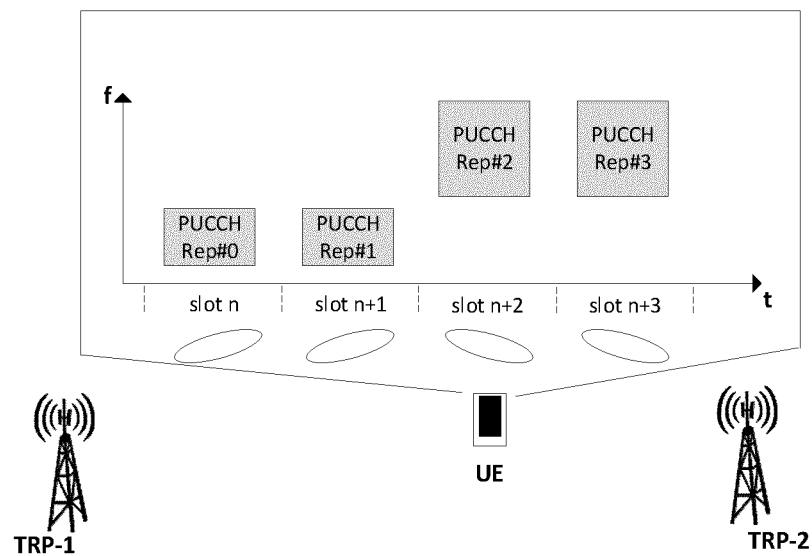

FIG. 3 depicts a scenario with two TRPs, namely TRP-1 and TRP-2. The first apparatus 102 in this example is a UE. A first link with TRP-1 has a large path loss, whereas a second link with TRP-2 has a small path loss. A repetition factor is set to 4. The repetition bundle then contains 4 repetitions. A first PUCCH resource index is used according to the example for the first half of the repetition bundle, i.e. a first repetition Rep #0 and second repetition Rep #1. And a second PUCCH resource index is used for a second half of the repetition bundle, i.e. a third repetition Rep #2 and fourth repetition Rep #3. The resource indexes are selected in such way that, for instance, the repetitions towards TRP-1 have a small number of PRBs to compensate for the large path loss, whereas the repetitions towards TRP-2 have a larger number of PRBs.

Although different number of PRBs and different initial PRB are illustrated in the example, other parameters may be different between the first two repetitions and the last two repetitions. For example, the number of symbols may be different. This may be controlled by a choice of the indicated or configured PUCCH resource indexes for the repetition bundle.

Generally, the method may comprise at the second apparatus 104: sending the first message A for indicating to the UE to configure a PUCCH for PUCCH transmission according to a first configuration for a first PUCCH resource, to determine a second configuration for a PUCCH repetition and to configure the first PUCCH or a second PUCCH for the PUCCH repetition according to the second configuration.

The first message A may comprise a first indication comprising the first PUCCH resource index and the second PUCCH resource index, for indicating to the UE to select the first PUCCH resource for the PUCCH transmission according the first PUCCH resource index, and for indicating to the UE to select the second PUCCH resource for the PUCCH repetition depending on the second PUCCH resource index. At least two PUCCH resource indexes identifying at least two PUCCH resources may be used for multiple PUCCH repetition/transmission occasions of a PUCCH repetition bundle.

The second apparatus 104 may be configured for selecting the first PUCCH resource or the second PUCCH resource from a set of configured PUCCH resources for the UE. The indicated PUCCH resource indexes may be selected from a subset of PUCCH resources configured in RRC or MAC.

The first message A or the second message B may comprise a first pattern or an indication thereof for indicating to the UE to select PUCCH resources for the PUCCH transmission, the PUCCH repetition and/or at least one further PUCCH repetition depending on the first pattern or the indication thereof. This first pattern may define the PUCCH resources for at least one repetition of the PUCCH transmission.

The first message A or the second message B may comprise a second pattern or an indication thereof for indicating to the UE to select slots or sub-slots for the PUCCH transmission, the PUCCH repetition and/or at least one further PUCCH repetition depending on the second pattern or the indication thereof. This second pattern defines the slots or sub-slots for at least one repetition of the PUCCH transmission.

A rule may be used that configures the UE to use the first PUCCH resource of the PUCCH transmission also for at least one PUCCH repetition on at least one non-indicated slot or sub-slot that immediately follows the slot or sub-slot for the PUCCH transmission.

A rule may be used that configures the UE to use the first PUCCH resource index for PUCCH repetitions on 'even' slot or sub-slot numbers and the second PUCCH resource index on 'odd' slot or sub-slot numbers, or wherein the rule is to use the first PUCCH resource index for PUCCH repetitions on 'even' repetition occasion numbers or indexes and the second PUCCH resource index on 'odd' repetition occasion numbers or indexes.

The second apparatus 104 may instruct the UE to determine the second PUCCH resource index for the PUCCH repetition(s) depending on a configuration or a parameter related to the PUCCH resource and/or PUCCH resource index indicated and/or configured for the PUCCH transmission. The parameter and/or configuration may be a PUCCH format configuration, a PUCCH spatial relation information or, equivalently, a TCI state. For example, different subsets of PUCCH resource indexes may be configured to be used for the PUCCH repetition(s) depending on the PUCCH format of the PUCCH transmission, e.g. whether it is format 1, 3 or 4.

Generally, the method may comprise at the first apparatus 102, e.g. the UE: configuring a PUCCH for a PUCCH transmission according to a first configuration for a first PUCCH resource, determining a second configuration for a PUCCH repetition, configuring the first PUCCH or a second PUCCH for the second PUCCH repetition according to the second configuration. The PUCCH repetition is a repetition of the PUCCH transmission. A first PUCCH resource index for the PUCCH transmission may differ from a second PUCCH resource index for the PUCCH repetition.

The UE may receive the first indication comprising a first PUCCH resource index and a second PUCCH resource index, select the first PUCCH resource for the PUCCH transmission according the first PUCCH resource index, select the second PUCCH resource for the PUCCH repetition depending on the second PUCCH resource index.

The UE may select the first PUCCH resource or the second PUCCH resource from the set of configured PUCCH resources for the UE.

The UE may receive the first pattern or the indication thereof and select PUCCH resources for the PUCCH transmission, the PUCCH repetition and/or at least one further PUCCH repetition of the PUCCH repetition bundle depending on the first pattern or the indication thereof.

The UE may receive the second pattern or the indication thereof and select slots or sub-slots for the PUCCH transmission, the PUCCH repetition and/or at least one further PUCCH repetition of the PUCCH repetition bundle depending on the second pattern or the indication thereof. This second pattern defines the slots or sub-slots for repetition(s) of the PUCCH transmission.

The UE may use the first PUCCH resource index also for the PUCCH repetition(s) in an occasion for the PUCCH repetition on at least one non-indicated slot or sub-slot that immediately follows the slot or sub-slot of for the PUCCH transmission depending on the corresponding rule.

The UE may use the first PUCCH resource index for repetitions on 'even' slot or sub-slot numbers and the second PUCCH resource index on 'odd' slot or sub-slot numbers, or wherein the rule is to use the first PUCCH resource index for repetitions on 'even' repetition occasion numbers or indexes and the second PUCCH resource index on 'odd' repetition occasion numbers or indexes depending on the corresponding rule.

The UE may determine the second PUCCH resource index for the second PUCCH repetition depending on a configuration or a parameter related to the PUCCH resource and/or PUCCH resource index indicated and/or configured for the PUCCH transmission, such as PUCCH format configuration, PUCCH spatial relation information or, equivalently, TCI state, etc.

Example 2 is for instance suitable for any kind of UCI, i.e. HARQ-ACK for dynamically scheduled PDSCHs, HARQ-ACK for SPS PDSCHs, SR, and CSI.

The second apparatus 104 may determine a configuration for the first apparatus 102 in a step 202. The content of the first message A and of the second message B may be determined in step 202.

In this example, the second apparatus 104 indicates with the first message A, e.g. via RRC or MAC, two numbers of PRBs and/or two numbers of symbols. The symbols may be the OFDM symbols. The second apparatus 104 may indicate two numbers of PRBs and/or two numbers of symbols per PUCCH resource index or per group of PUCCH resources, or as part of the format configuration or of format configurations. Alternatively, at least one number of PRBs and/or one number of symbols may be indicated via DCI. In this case, in addition to a single PUCCH resource index that may be indicated and which has a configured number of PRBs and/or symbols, a second number of PRBs or symbols may be indicated in the DCI.

In this example, the second apparatus 104 indicates with the second message B, e.g. via RRC or MAC, on how to map the indicated PUCCH resources to multiple repetitions within the PUCCH repetition bundle. For example two spatial relations, i.e. beams or TCI states, are indicated for the PUCCH repetition bundle. The spatial relations may be indicated for a substantially same PUCCH resource, e.g. via the PUCCH resource index. In this case at least one number of PRBs and/or number of symbols may depend on or be associated to at least one of the spatial relations or TCI states. This allows to tune the numbers of PRBs and/or symbols depending on the TRP towards which or the beam on which the repetition is transmitted.

After the first apparatus 102 is configured in a step 204 accordingly, the third message C may be sent according to the configuration.

An exemplary case is described below referencing FIG. 4.

Figure 4:
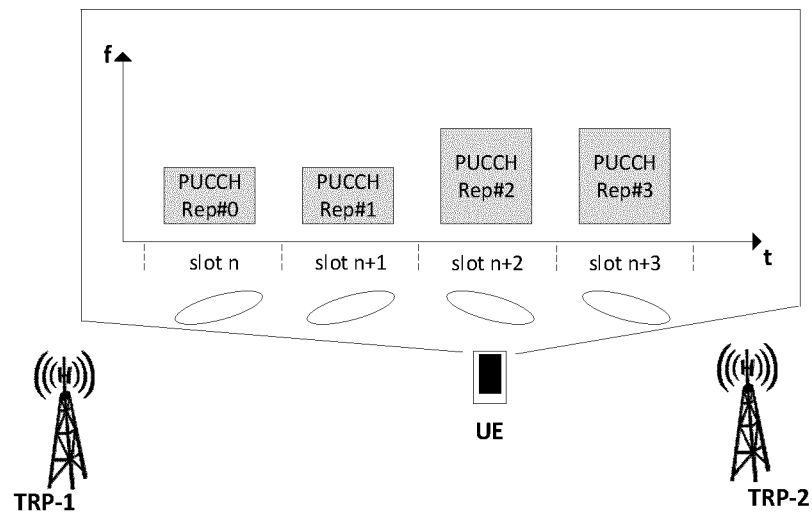

FIG. 4 depicts a scenario with two TRPs, namely TRP-1 and TRP-2. The first apparatus 102 in this example is a UE. A first link with TRP-1 has a large pathloss, whereas a second link with TRP-2 has a small pathloss. A PUCCH repetition factor is set to 4. The PUCCH repetition bundle then contains 4 repetitions. The resources for the 4 repetitions are determined based on the single PUCCH resource index. According to this example, the number of PRBs and/or the number of symbols for the repetitions is controlled depending on the TRP towards or the beam on which the repetitions are sent. This is illustrated in FIG. 4, where the first two repetitions and the last two repetitions have a different number of PRBs and/or a different number of symbols. Thus, these numbers could be tuned differently for TRP-1 and TRP-2.

Generally, the method may comprise at the second apparatus 104: sending the first message A for indicating to the UE to configure a PUCCH for a PUCCH transmission according to a first configuration for a first PUCCH resource, to determine a second configuration for a PUCCH repetition, to configure the first PUCCH or a second PUCCH for the PUCCH repetition according to the second configuration, wherein a parameter of a first set of parameters of the first configuration differs from a parameter of a second set of parameters of the second configuration and wherein the PUCCH repetition is a repetition of the PUCCH transmission.

The parameter may define at least one of a number of consecutive symbols, a number of PRBs, and a starting symbol. The first configuration and the second configuration may define parameters for PUCCH format 1, 3, or 4, but also for any other PUCCH format.

The first message A may comprise an indication comprising a first number of PRBs and a second number of PRBs, for indicating to the UE to determine the parameter of the first set of parameters of the first configuration according to the first number, for indicating to the UE to determine the parameter of the second set of parameters of the second configuration according to the second number.

The first message A may comprise an indication comprising a first number of symbols and a second number of symbols, for indicating to the UE to determine the parameter of the first set of parameters of the first configuration according to the first number, and for indicating to the UE to determine the parameter of the second set of parameters of the second configuration according to the second number.

This indication may comprise a first element, wherein the third indication comprises a second element, for indicating to the UE to map the first element to the first number of symbols, and for indicating to the UE to map the second element to the second number of symbols. This indication is associated with or mapped to at least two numbers of symbols.

The first message A or the second message B may comprise the first pattern or the indication thereof for indicating to the UE to configure PUCCH resources for the PUCCH transmission, the PUCCH repetition and/or at least one further PUCCH repetition of the PUCCH repetition bundle depending on the first pattern or the indication thereof.

The first message A or the second message B may comprise the second pattern or the indication thereof for indicating to the UE to configure slots or sub-slots for the PUCCH transmission, the PUCCH repetition and/or at least one further PUCCH repetition of the PUCCH repetition bundle depending on the second pattern or the indication thereof.

The UE may be instructed to determine the first configuration or the second configuration depending on a configuration or a parameter related to the PUCCH resource and/or PUCCH resource index indicated and/or configured for the PUCCH transmission, such as PUCCH format configuration, PUCCH spatial relation information or, equivalently, TCI state, etc.

Generally, the method may comprise at the first apparatus 102, e.g. the UE: configuring a PUCCH for a PUCCH transmission according to a first configuration for a first PUCCH resource, determining a second configuration for a PUCCH repetition, configuring the first PUCCH or a second PUCCH for the PUCCH repetition according to the second configuration, wherein the parameter of the first set of parameters of the first configuration differs from the parameter of a second set of parameters of the second configuration.

The UE may receive the indication comprising the first number of PRBs and the second number of PRBs and determine the parameter of the first set of parameters of the first configuration according to the first number, and determine the parameter of the second set of parameters of the second configuration according to the second number.

The UE may receive the indication comprising the first number of symbols and the second number of symbols, and determine the parameter of the first set of parameters of the first configuration according the first number, and determine the parameter of the second set of parameters of the second configuration according the second number.

The UE may map the first element to the first number of symbols, and map the second element to the second number of symbols.

The UE may receive the first pattern or the indication thereof and configure the PUCCH resources for the PUCCH transmission, the PUCCH repetition and/or at least one further PUCCH repetition of the PUCCH repetition bundle depending on the first pattern or the indication thereof.

The UE may receive the second pattern or the indication thereof and configure slots or sub-slots for the PUCCH transmission, the PUCCH repetition and/or at least one further PUCCH repetition of the PUCCH repetition bundle depending on the second pattern or the indication thereof.

The UE may determine the first configuration or the second configuration depending on a configuration or a parameter related to the PUCCH resource and/or PUCCH resource index indicated and/or configured for the PUCCH transmission, such as PUCCH format configuration, PUCCH spatial relation information or, equivalently, TCI state, etc.

The first message A and the second message B may be sent in a joint message. The first message A and the second message B may be sent in this order or the second message B may be sent before the first message A. The signaling of the content of the first message A and/or the second message B may be sent in a plurality of separate messages instead of in the first message A or the second message B.

The aforementioned indications may be defined by at least one codepoint in DCI, MAC CE, or RRC format. In one aspect, a UCI configuration, a SPS configuration, a SR configuration or a CSI configuration may be sent comprising any of the aforementioned indications.

A DCI and/or MAC CE element may identify the first resource index, the second resource index, the first pattern, the second pattern or the third pattern in a map or table or according to a corresponding rule.

The term processor according to one aspect of the description refers to at least one processor, and at least one memory including computer program code.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

Abbreviations

CSI Channel State Information
DCI downlink control information gNB next generation evolved node B
gNB-CU evolved node B central unit
gNB-DU next generation evolved node B distributed unit
MAC Medium Access Control
multi-TRP multiple transmission and reception points
OFDM Orthogonal Frequency-Division Multiplexing
P-CSI periodic CSI
PDCP Packet Data Convergence Protocol
PRB Physical Resource Block
PUCCH Physical Uplink Control Channel
PRI PUCCH resource indicator
RAN radio access network
RLC Radio Link Control
RRC Radio Resource Control layer
SDAP Service Data Adaptation Protocol
SR scheduling request
TCI transmission configuration indicator
UCI Uplink Control Information
UE User Equipment

The invention claimed is:

1. A first apparatus comprising at least one processor, at least one memory including computer program code, and at least one receiver, the at least one processor, the at least one memory, and the at least one receiver configured with the computer program code to cause the first apparatus at least to;
  receive a first indication comprising a first configuration and a second indication comprising a second configuration wherein the first configuration and the second configuration include a PUCCH format configuration;
  receive a plurality of parameters of the first configuration and the second configuration that define:
    a starting symbol;
    consecutive symbols;
    Physical Resource Blocks (PRBs);
    PUCCH spatial relation information; and
    a transmission configuration indicator (TCI) state:
  configure a Physical Uplink Control Channel (PUCCH) for a PUCCH transmission according to the first configuration for a first PUCCH resource;
  configure the first PUCCH resource and a second PUCCH resource for a PUCCH repetition according to the second configuration, wherein the PUCCH repetition is a repetition of the PUCCH transmission within a repetition bundle having a repetition factor set to four;
  receive a third indication comprising a first PUCCH resource index and a second PUCCH resource index;
  receive a fourth indication comprising a first number of PRBs and a second number of PRBs;
  receive a fifth indication comprising a first element and a second element, wherein the first element is mapped to a first number of symbols and the second element is mapped to a second number of symbols;
  determine at least one first parameter of a characteristic of a PUCCH format for the PUCCH transmission according to the first configuration that differs from at least one second parameter of the characteristic of the PUCCH format for the PUCCH repetition according to the second configuration, wherein the first PUCCH resource index is used for a first half of the repetition bundle and the second PUCCH resource index is used for a second half of the repetition bundle;
  select the first PUCCH resource for the PUCCH transmission according to the first PUCCH resource index and select the second PUCCH resource for the PUCCH repetition depending on the second PUCCH resource index, wherein the first PUCCH resource and the second PUCCH resource are selected from a set of configured PUCCH resources for the first apparatus;
  determine the characteristic of the PUCCH format for the PUCCH transmission according to the plurality of parameters of the first configuration; and
  determine the characteristic of the PUCCH format for the PUCCH repetition according to the plurality of parameters of the second configuration.

* * * * *